July 3, 1962

P. C. HITCHCOCK 3,042,794

MANUFACTURING FUSE-LINKS HAVING A RIVET
INSERT OF A LOW FUSING POINT METAL

Filed Jan. 12, 1960

INVENTOR.

Paul C. Hitchcock

BY

Atty.

under pressure applied by the upper upsetting tool. The tool is removed from the fuse link. The resulting fuse link is ready for use in a time-lag fuse.

United States Patent Office 3,042,794
Patented July 3, 1962

3,042,794
MANUFACTURING FUSE-LINKS HAVING A RIVET INSERT OF A LOW FUSING POINT METAL
Paul C. Hitchcock, Newburyport, Mass., assignor to The Chase-Shawmut Company, Newburyport, Mass.
Filed Jan. 12, 1960, Ser. No. 1,970
6 Claims. (Cl. 219—150)

This invention has reference to manufacturing electric fuses, and more particularly to manufacturing time lag fuses.

If a fuse link made of a base metal having a relatively high fusing point as, for instance, copper or silver, is operatively associated with an alloy-forming metal having a relatively low fusing point, e.g. tin, the metal having the lower fusing point will fuse when its fusing point is reached by the flow of current through the base metal, and corrode the base metal to the point of forming a circuit interrupting break. This metallurgical reaction is widely used in manufacturing fuse links for use in time lag fuses.

In order to achieve sufficient uniformity of the product the low fusing point metal must be applied to the high fusing point metal in form of a precisely pre-measured quantity. This can be achieved by inserting a rivet of a metal having a relatively low fusing point into a perforation provided in a fuse link made of a metal having a relatively high fusing point, as shown in United States Patent 2,557,926 to K. W. Swain, Time-Delay Electric Fuse, issued June 26, 1951.

When a rivet made of a low fusing point metal which has been inserted into a perforation provided in a fuse link made of a high fusing point metal is upset, the shank of the rivet expands radially. This radial expansion of the rivet may tend to impair the mechanical integrity of the base metal. This danger is particularly imminent where the diameter of the shank of the rivet comes relatively close to the width of the link, and where there is an unfavorable polarization of the grain of the metal resulting in a minimum of resistance of the link against stress and strain. These two unfavorable factors may combine. Under such circumstances many links are lost in the process of manufacturing the links, the process of assembling the links in fuses, and during shipment of fuses comprising such critical links.

It is, therefore, one object of the invention to provide a method for manufacturing fuse links of the type under consideration wherein there is a minimum distortion of the rivet hole by the expanding shank of the rivet.

Another object of the invention is to provide a method for manufacturing fuse links of the type under consideration which eliminates, or minimizes, the danger of breakage of the link at the point adjacent the rivet hole.

Another object of the invention is to provide means for improving the process of manufacturing fuse links of the type disclosed and claimed in the above Swain patent.

Still another object of the invention is to generally improve fuse links of the type under consideration and the method of manufacturing the same.

Further objects, advantages and features of this invention will become apparent as the following description proceeds and the features of novelty which characterize the invention will be pointed out with particularity in the claims annexed to, and forming part of, this specification.

For a better understanding of the invention reference may be had to the accompanying drawings illustrating the invention wherein—

Figure 1:
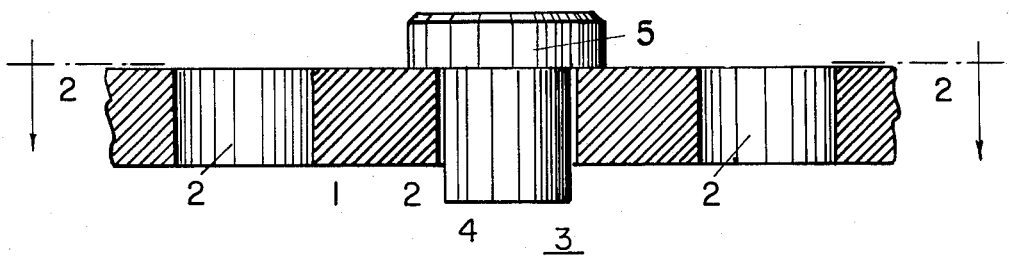
FIG. 1 shows a rivet inserted in a rivet hole before the rivet is upset and is in substance a section along 1—1 of FIG. 2.
Figure 2:
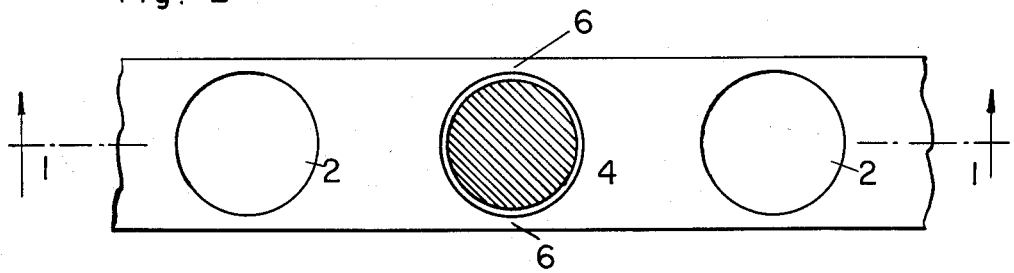
FIG. 2 is a section along 2—2 of FIG. 1.

Referring now to the drawings, and more particularly to FIGS. 1 and 2 thereof, numeral 1 has been applied to indicate a ribbon fuse link made of a metal having a relatively high conductivity and a relatively high fusing point, e.g. silver or copper. Fuse link 1 is provided with three circular perforations 2 which are serially arranged along fuse link 1. The central perforation 2 is used as rivet hole. Rivet 3 is made of a metal having a relatively low fusing point, e.g. tin, or an alloy of tin, and its shank 4 is inserted into the central perforation 2 with its head 5 resting on the upper surface of link 1. It is desirable to associate a fluxing agent with rivet 1, as more fully explained in the above Swain patent, and reference is made to this patent as far as this aspect of the manufacturing process of the link is concerned. If conventional upsetting tools are used for upsetting the rivet 3, the shank thereof expands radially to such an extent that there is an imminent danger of breakage of link 1 at its two points 6 of minimum cross-sectional area situated immediately adjacent to rivet 3. This danger is so serious as to practically exclude conventional upsetting tools for the purpose in hand. The danger can be somewhat reduced by driving a pointed tool into the lower surface of shank 4 to thereby upset shank 4. While this choice of tool thus has some beneficial effects, these are not sufficiently far reaching to safely manufacture fuse links wherein the points of minimum cross-sectional area situated immediately adjacent to the rivet hole are mechanically weak, as may be expected when the cross-section of these points is small.

Figure 3:
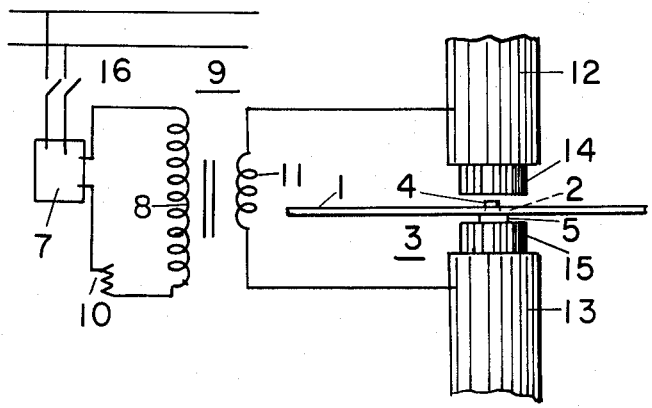
FIG. 3 illustrates diagrammatically the equipment used for carrying this invention into effect.

Referring now to FIG. 3, the particular equipment used for the new riveting process comprises a timer or time switch 7 for controlling an electric circuit including the primary winding 8 of a transformer 9 and a regulating impedance 10. The secondary winding 11 of transformer 9 has a smaller number of turns than the primary winding, and is connected to a pair of electrodes 12, 13. The transformer 9 may be of the type generally used for spot-welding. Electrodes 12, 13 are made of metal and have a relatively low resistance. Each electrode is provided with an insert or upsetting tool to which reference numerals 14 and 15 have been applied. Inserts or upsetting tools 14, 15 have a relatively high electric resistance. They may, for instance, be made of carbon.

Figure 4:
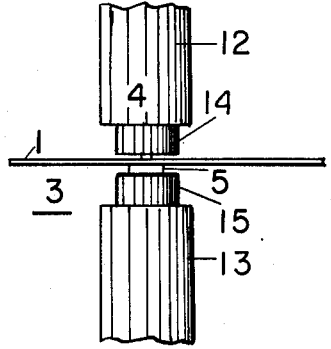
FIG. 4 illustrates a detail of FIG. 3 in another operating position.

In carrying the invention into effect the shank 4 of rivet 3 is placed into a perforation 2 provided in a fuse link 1. It will be understood that rivet 3 is made of a metal having a relatively low fusing point as, for instance, tin, and that the base metal of the fuse link is a metal having a relatively high conductivity and a relatively high fusing point as, for instance, silver or copper. Link 1 and rivet 3 are placed between spaced electrodes 12, 13 and their spaced inserts or upsetting tools 14, 15. Thereafter the secondary circuit of transformer 9 is closed by reducing the spacing of parts 12, 13 and 14, 15 until the upper upsetting tool 14 engages and compresses the shank 4 of rivet 3. This position of parts 12 and 14 has been shown in FIG. 4. At the beginning of the process the timer 7 is set to close the circuit of the primary winding 8 of transformer 9 for pre-determined equal periods of time. The primary circuit of transformer 9 is being closed by switch 16 for such a pre-determined period of time after upsetting tool 14 has been brought into engagement with the upper surface of shank 4, or substantially simultaneously with engagement of shank 4 by tool 14. Thus the secondary circuit of transformer 9—including electrodes 12, 13, high resistance inserts 14, 15 and rivet 3—is energized for a predetermined period of time. As a result, high resistance inserts 14, 15 and rivet 3 are heated in an exactly predetermined fashion. The heating of rivet 3 is sufficient to soften the low fusing point rivet metal during the upsetting process without, however, causing complete liquefication of that metal. While current is caused to flow through parts 12, 14, 3, 15, 13, pressure is being maintained by parts 13 and 14 upon rivet 3. If the expanding shank 4 of rivet 3 should engage the edges of the rivet hole 2, these edges are not driven radially outwardly by the expanding shank, resulting in intolerable stresses at the points of minimum cross-sectional area indicated in FIG. 2 by the reference numeral 6. Since the rivet is softened during the upsetting operation, or has a softened surface, the edges of the rivet hole 2 may easily penetrate into the shank of the rivet upon engagement of the rivet hole by the shank, thus safely precluding mechanical damage to, or impairment of, the base metal of the fuse link 1 by the shank 4 of rivet 3.

It will be apparent that parts 12 and 14 and parts 13 and 15 could be replaced by a pair of integral electrodes made of a high resistance material. It is, however, preferable to use electrodes having a relatively low resistance and to provide inserts the resistance of which is high, whereby heat generation is localized immediately adjacent to the rivet to be upset.

Having disclosed a preferred way of carrying my invention into effect, it is desired that the same not be limited to the particular arrangement of parts and heating means disclosed. It will be obvious to any person skilled in the art that many modifications and changes may be made without departing from the broad spirit and scope of the invention. Therefore it is desired that the invention be interpreted as broadly as possible and that it be limited only as required by the prior state of the art.

I claim as my invention:

1. A method for manufacturing fuse links having a rivet insert of a low fusing point metal comprising the steps of inserting a rivet of a metal having a relatively low fusing point into a perforation provided in a fuse link of a metal having a relatively high fusing point, of thereafter heating the rivet sufficiently while inserted into said perforation to soften the low fusing point metal without causing complete liquefication thereof, and of upsetting the rivet by pressure while still heated and softened.

2. A method for manufacturing fuse links having a rivet insert of a low fusing point metal comprising the steps of inserting the shank of a rivet of a metal having a relatively low fusing point into a perforation provided in a fuse link of a metal having a relatively high fusing point, and of thereafter simultaneously applying heat and pressure to said rivet thereby upsetting said rivet while in a softened state.

3. A method for manufacturing fuse links having a rivet insert of a low fusing point metal comprising the steps of inserting the shank of a rivet of a metal having a relatively low fusing point into a perforation of a fuse link of a metal having a relatively high fusing point, of placing said shank and the head of said rivet between a pair of spaced upsetting tools, of reducing the spacing between said pair of tools and of applying pressure by said pair of tools upon said shank and said head, and of heating said pair of tools by the passage of an electric current sufficiently to cause softening of said shank while continuing to apply pressure upon said head and said shank.

4. A method for manufacturing fuse links having a rivet insert of a low fusing point metal comprising the steps of inserting the shank of a rivet of a metal having a relatively low fusing point into a perforation provided in a fuse link of a metal having a relatively high fusing point, of placing said shank and the head of said rivet between a pair of spaced electrodes forming part of the secondary circuit of a transformer, and of closing said secondary circuit by reducing the spacing between said pair of electrodes for a sufficient period of time to cause softening of said shank and of applying pressure by said pair of electrodes upon said shank and said head.

5. A method for manufacturing fuse links having a rivet insert of a low fusing point metal comprising the steps of inserting the shank of a rivet of a metal having a relatively low fusing point into a perforation provided in a fuse link of a metal having a relatively high fusing point, of placing said shank and the head of said rivet between a pair of spaced electrodes forming part of the secondary circuit of a transformer, of closing said secondary circuit by reducing the spacing between said pair of electrodes, and of closing the primary circuit of said transformer for a predetermined period of time sufficient to cause softening of said shank while maintaining pressure by means of said electrodes upon said shank and upon said head.

6. A method for manufacturing fuse links having a rivet insert of a low fusing point metal comprising the steps of inserting a rivet substantially of tin into a perforation provided in a fuse link substantially of copper fusing point, of thereafter clamping the shank and the head of said rivet between a pair of upsetting tools included in a circuit having a relatively high resistance, and of passing a current through said circuit to heat said pair of upsetting tools sufficiently to cause softening of said shank while maintaining clamping pressure upon said head and said shank.

References Cited in the file of this patent

UNITED STATES PATENTS

| | | |
|---|---|---|
| 404,306 | Ries | May 28, 1889 |
| 555,131 | Thomson | Feb. 25, 1896 |
| 580,475 | Thomson | Apr. 13, 1897 |
| 1,261,973 | Taylor | Apr. 9, 1918 |
| 1,451,894 | Rypinski | Apr. 17, 1923 |